C. SLOAN.
EYE TESTING APPARATUS AND PROCESS.
APPLICATION FILED AUG. 10, 1918.

1,417,283.

Patented May 23, 1922.
4 SHEETS—SHEET 1.

INVENTOR,
Clark Sloan,
BY Hull, Smith, Brock & West,
ATTYS.

C. SLOAN.
EYE TESTING APPARATUS AND PROCESS.
APPLICATION FILED AUG. 10, 1918.

1,417,283.

Patented May 23, 1922.
4 SHEETS—SHEET 2.

INVENTOR,
Clark Sloan.
BY Hull, Smith, Brock & West
ATT'YS.

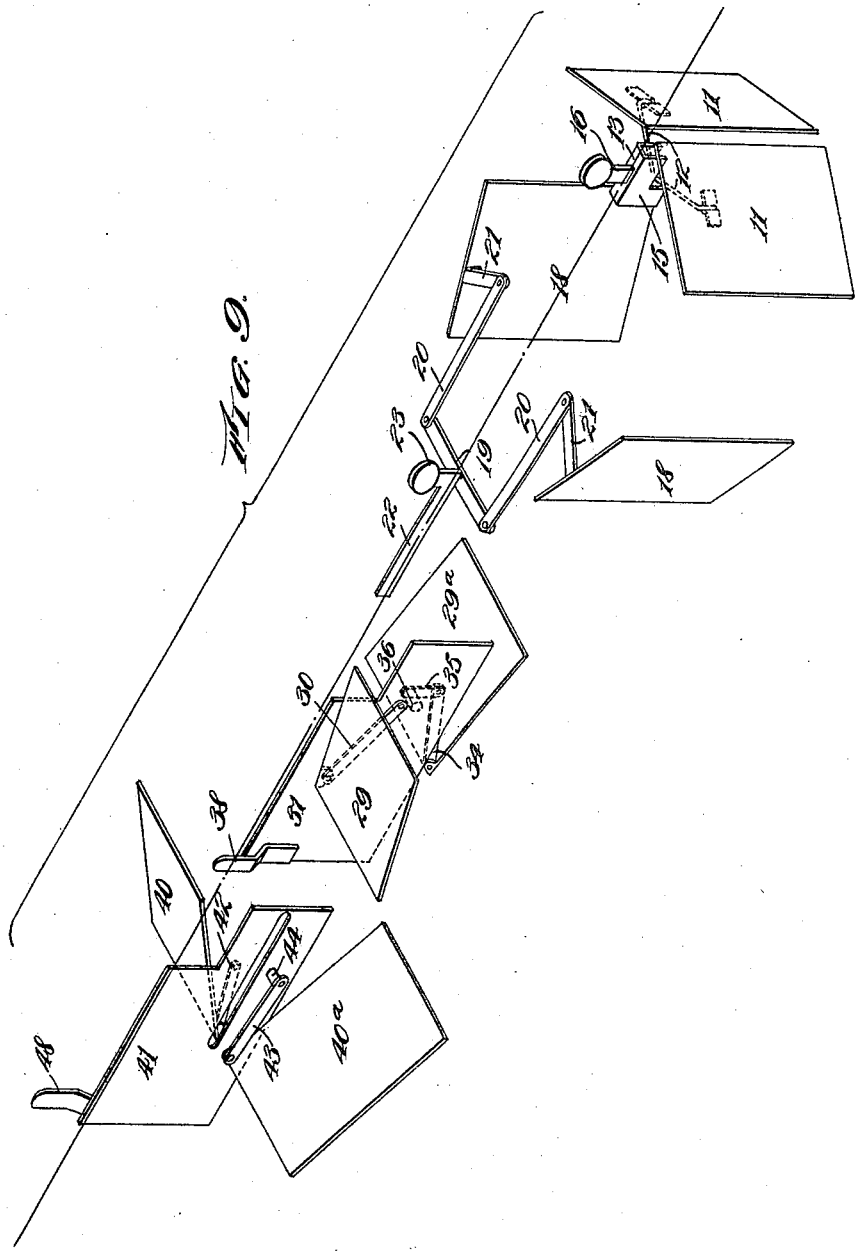

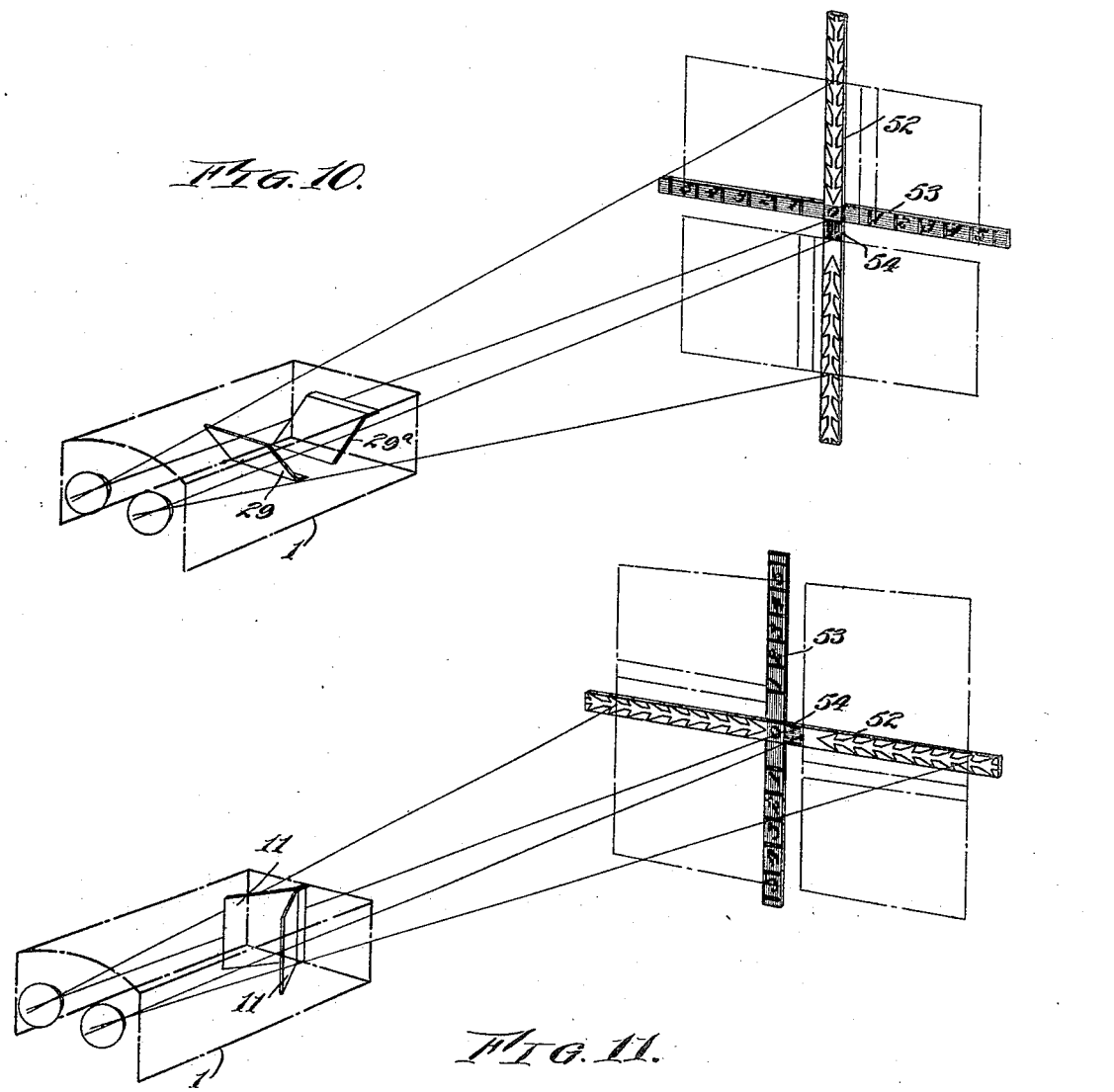

UNITED STATES PATENT OFFICE.

CLARK SLOAN, OF EAST CLEVELAND, OHIO.

EYE-TESTING APPARATUS AND PROCESS.

1,417,283.    Specification of Letters Patent.    Patented May 23, 1922.

Application filed August 10, 1918. Serial No. 249,264.

*To all whom it may concern:*

Be it known that I, CLARK SLOAN, a citizen of the United States, residing at East Cleveland, in the county of Cuyahoga and State of Ohio, have invented a certain new and useful Improvement in Eye-Testing Apparatus and Processes, of which the following is a full, clear, and exact description, reference being had to the accompanying drawings.

This invention relates to a process and an instrument for determining variations in the horizontal and vertical balance between the eyes. It is the general purpose and object of the invention to enable such variations in balance to be quickly and accurately ascertained; to provide an instrument for this purpose having means whereby the fusion faculty of the eyes may be suspended so that the existing state of balance of the eyes and the optical centers of their corrective lenses while being worn, may be determined and measured while similar images may be beheld at one and the same time by both eyes. In the specific embodiment of my instrument illustrated herein, I accomplish the foregoing results in and through the use of nontransparent partitions or shutters which are adjustable for the obscuration of certain portions of the visual fields by overlapping said fields from opposite directions, thus producing a band or zone of obscuration between said fields.

Figure 1:
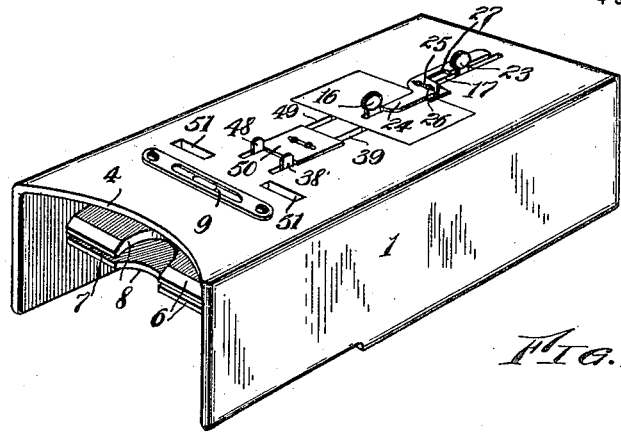
Figure 7:
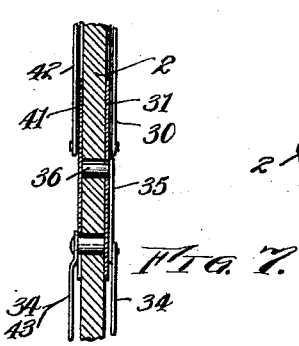
Figure 6:
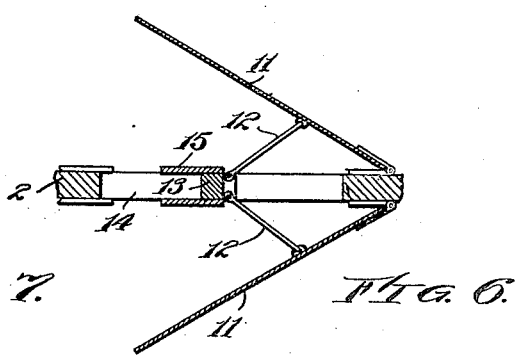
Figure 8:
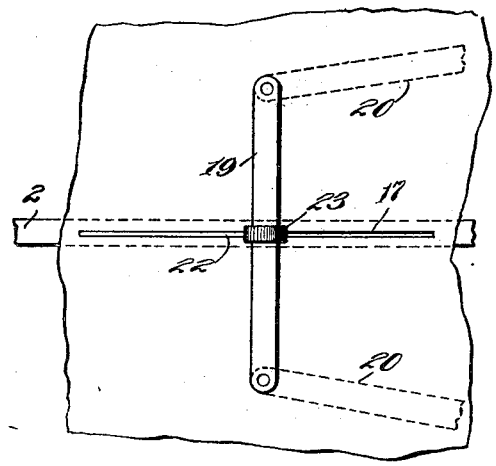
Figure 2:
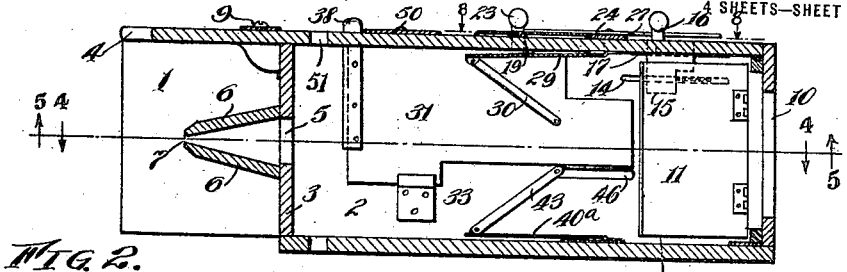
Figure 3:
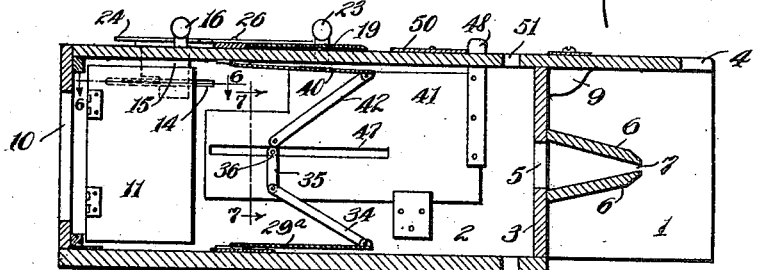
Figure 4:
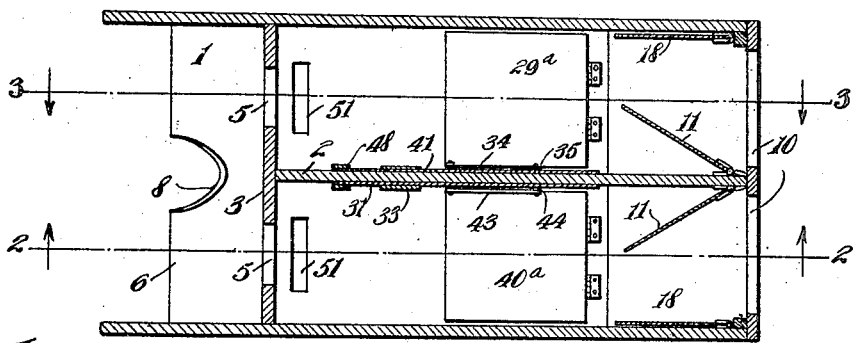
Figure 5:
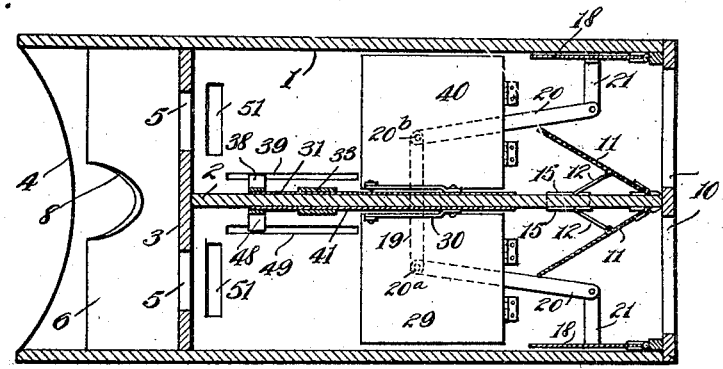

In the drawings forming part hereof, Fig. 1 represents a view in perspective of an instrument or apparatus capable of realizing my invention; Figs. 2 and 3 longitudinal sectional views corresponding respectively to the lines 2—2 and 3—3 of Fig. 4; Fig. 4 is a sectional view corresponding to the sectional line on Fig. 2 and looking in the direction of the arrows 4—4 and Fig. 5 is a similar view looking in the direction of the arrows 5—5; Figs. 6 and 7 are sectional details corresponding respectively to the lines 6—6 and 7—7 of Fig. 3; Fig. 8 a detail corresponding to the lines 8—8 of Fig. 2; Fig. 9 a diagrammatic perspective view of the shutters and their operating connections; and Figs. 10 and 11 are diagrammatic views illustrating the manner in which the instrument is used.

Describing by reference characters the various parts illustrated herein, 1 denotes generally a rectangular casing having a central vertical longitudinal partition 2 extending from the rear end thereof, a transverse vertical partition 3 adjacent the front end, the bottom of the casing being shown as extending from the rear of the same substantially as far as the last mentioned partition. The front of the top of the casing is concaved, as shown at 4, for convenience of application to the observer. The partition 3 is provided with a pair of apertures 5, equidistantly spaced from the top and bottom of the casing and from the partition 2, the said apertures being preferably rectangular in outline and spaced apart to accommodate the distance between the eyes of the observer. These apertures register with a view slit which may be conveniently formed by and between a pair of plates or partitions 6 projecting forwardly from the partitions 3 and having their rear edges in contact with said partition above and below said apertures, the said plates or partitions converging forwardly to provide the slit 7. These plates or partitions extend from one side to the other of the casing within the hooded front portion thereof, the central portions of the forward ends of said plates or partitions being cut away, as shown at 8, to accommodate the nose of the observer. In the top of the casing there is provided a spirit level 9.

The partition 2 provides, with the top, bottom and sides of the casing, two rectangular openings at the rear end of the same, said openings being indicated at 10. Hinged to each side of the rear end of the partition 2 is a pair of shutters 11, the shutters being arranged to swing about vertical pivots, whereby as their free ends are moved away from said partition, they will increasingly obstruct the lateral visual fields of the eyes of the observer. These shutters may be operated in any convenient manner, as by means of links 12 each connected at one end to a shutter and at its opposite end to a head 13 slidable in a horizontal slot 14 in said partition and connected to opposite sides 15 of a sheet metal channel the upper member whereof is slidable within a slot or space provided between the top of the partition and the casing cover, there being an operating stem 16 connected with said upper member and projecting through a slot 17 in said cover.

Pivoted to the rear ends of the opposite sides of the casing 1 on vertical hinges are the shutters 18. These shutters may be operated simultaneously by means of a cross head 19 mounted in a recess formed in the top of the casing and having its opposite ends connected by links 20 and 21 to said shutters. The cross head is connected to a bar 22 having an operating stem 23, the bar 22 being mounted in a slot in the cover of the casing and the stem 23 projecting through the slot 17. The shutters 18 are substantially the full height of the interior space of the casing and, when their free edges are swung inwardly or toward the partition, they will cover increasingly greater portions of visual fields of the eyes of the observer. Secured to the top of the casing above the slot 17 is a locking device which prevents the operation of one set of shutters (11 or 18) while the other set is being operated. This locking device comprises a plate 24 having a transverse slot 25 cooperating with headed pins 26 carried by the casing cover. When the plate is in the position shown in Fig. 1 one end of the same covers the slot 17, whereby it blocks the movement of the stem 16 but permits the stem 23 to be operated in said slot. When the stem 23 is moved to shutter-closing position, it will register with a notch 27 in said plate, and the plate may then be shifted transversely, thereby locking the stem 23 but uncovering the slot 17 so as to permit the movement of the stem 16. In order to ensure accurate operation of the shutters 18 by the cross head and the links 20, 21, the pivots 20ª between said cross head and links are mounted in slots 28.

Pivoted on horizontally arranged hinges adjacent the top and the bottom of the casing, respectively, and on opposite sides of the partition 2 are the shutters 29, 29ª. The shutter 29 is shown as connected by a link 30 with a plate 31 mounted on a slideway provided between a plate 33 carried by one side of the partition 2 and a slot in the lower side of the cover. The shutter 29ª is operated from said plate by means of a link 34 and an arm 35 connected to said link and to said plate by a stud 36 extending through a slot 37 in the partition 2. An operating stem 38 for the plate 31 extends through a slot 39 in the cover of the casing.

Also pivoted on horizontally arranged hinges adjacent the top and bottom of the casing, respectively, and on opposite sides of the partition 2 are the shutters 40, 40ª. These shutters are operated in substantially the same manner as the shutters 29, 29ª, the plate 41 to which their respective links are connected being arranged on the opposite side of the partition 2 from the plate 31. The shutter 40 is connected directly to said plate by means of a link 42 while the shutter 40ª is connected to said plate by means of a link 43 and an arm 44 connected to said link and to a stud 45 extending through a slot 46 in the partition 2. Connected with the plate 41 is a stem 48 extending through a slot 49 in the cover of the casing parallel with the slot 39. A transversely shiftable plate 50 on the cover is adapted by its movement to cover either of the slots 39 and 49 and uncover the other, thereby to lock one or the other of the operating stems 38 and 48 when the other is free to be moved in its slot. The plate 41 is provided with a slot 47 for the stud 36, so that either plate may be operated without affecting the other.

A diagrammatic illustration of the shutter movements is shown in Fig. 9, wherein the central line indicates the position of the partition 2, the plates 31 and 41 with their respective operating stems and the connections of the shutters with the plates being indicated by the numerals employed heretofore, the parts for operating the shutters being spaced longitudinally for clearness of illustration.

While I have shown the means for supporting and operating the shutters as a casing, I do not propose to be limited to the use of such casing, as the principles of my invention may be realized in conjunction with a supporting means other than a casing.

In Figs. 10 and 11 there is illustrated diagrammatically the manner of using my invention in connection with a vertical rectilinear object and a horizontal rectilinear object, the object in each case being associated with a scale from which the state of balance of each eye may be ascertained and correction therefor made by the use of prisms, which may be conveniently inserted through slots 51 provided therefor in the top of the instrument or casing. In Fig. 10 I have shown a vertical rectilinear object 52 having arrow heads arranged equidistantly apart and on opposite sides of the central portion thereof. This rectilinear object is pivoted at its central portion to a rule or other device 53 having thereon numerals extending in opposite direction from the central portion thereof, said numerals indicating the degrees of the lateral displacement of balance. One of the horizontally pivoted shutters is indicated at 29 and the other at 29ª. The first of these shutters is so arranged as to cover the lower field of the retina of the right eye of the observer while the other shutter is arranged so as to cover the upper field of the retina of the left eye. In order to procure a band or zone of obscuration between such fields, the shutters will be set so as to cover respectively a little more than the lower and the upper half of the retinas of the eyes with which they are respectively employed. This will result in producing a horizontal band or zone 54 extending across and including the central portion of the rectilinear object. The upper and lower portions of the recti- linear object will be displaced along the indicator scale 53, the degree of displacement of such portions of the object being indicated by the numerals on opposite sides of said scale or indicating device. Thereby inserting into the slots 51 in the top of the casing prisms corresponding to such degrees of heterophoria as may be indicated, the two parts of the object 51 may be brought into vertical alignment.

In Fig. 11 I have shown the arrangement of the rectilinear object, scale, and shutters, as employed in examining for lack of vertical balance between the eyes of the observer. In this case, the rectilinear object is placed horizontally, with the scale or indicating device arranged vertically between the arrows. A pair of vertically hinged shutters 11 are shown as adjusted so that each will cover slightly more than the outer half of the retina of each eye, thereby producing a central vertical band or zone 54 of obscuration. The vertical displacement of each side of the object 52 will then be determined by the positions which the said portions occupy with reference to the scale or indicating device 53, and correction for this lack of balance may be made, as before, by inserting appropriate prisms into the slots provided in the casing. After having made these examinations for vertical and horizontal balance, it is then a mere matter of incorporating the prisms into the corrective glasses.

For simplicity of illustration, I have shown in Figs. 10 and 11 only one set of horizontally movable shutters and only one set of vertically movable shutters. In the event that it is desirable to use the other set of horizontally movable shutters or the other set of vertically movable shutters, it is evident that they may be employed with equal facility.

Having thus described my invention, what I claim is:—

1. An instrument for the purpose described comprising a support, a pair of horizontally pivoted shutters on said support adapted to be moved to cover the upper and the lower portions, respectively, of the retinal fields of the eyes of the observer, a second pair of horizontally pivoted shutters on said support adapted to be moved to cover the lower and the upper portions respectively, of the retinal fields of the eyes of the observer, a pair of vertically pivoted shutters adapted to be moved to cover the inner portions of the retinal fields of the eyes of the observer, a second pair of vertically pivoted shutters adapted to be moved to cover the outer portions of the retinal fields of the eyes of the observer, a rectilinear object having a central portion corresponding to such band or zone of obscuration and series of indicia on opposite sides of such central portion, and a scale arranged at an angle to and extending across the central portion of said object and having thereon numerals indicating the degrees of displacement of balance.

2. An instrument for the purpose described comprising a support, a pair of horizontally pivoted shutters on said support adapted to be moved to cover the upper and the lower portions, respectively, of the retinal fields of the eyes of the observer, a second pair of horizontally pivoted shutters on said support adapted to be moved to cover the lower and the upper portions, respectively, of the retinal fields of the eyes of the observer, a pair of vertically pivoted shutters adapted to be moved to cover the inner portions of the retinal fields of the eyes of the observer, and a second pair of vertically pivoted shutters adapted to be moved to cover the outer portions of the retinal fields of the eyes of the observer.

3. An instrument for the purpose described comprising a casing having a central vertical longitudinal partition adapted to extend outwardly from midway between the eyes of the observer, a pair of shutters vertically pivoted adjacent to said partition and adapted to be moved outwardly therefrom thereby to obscure the inner portions of the retinal fields of the eyes of the observer, a pair of shutters vertically pivoted adjacent to each side of the casing and movable therefrom toward the partition thereby to cover outer portions of the retinal fields of the eyes of the observer, shutters pivoted adjacent to the top and the bottom of said casing and on opposite sides of said partition and each movable about a horizontal axis, a fourth pair of shutters pivoted respectively adjacent the top and the bottom of the casing and on opposite sides of the partition and movable about a horizontal axis, a rectilinear object having series of equidistantly spaced indicia on opposite sides of its central portion, and a scale arranged at an angle to and extending across the central portion of said object and having thereon numerals indicating the degrees of displacement of balance.

4. An instrument for the purpose described comprising a casing having a central vertical longitudinal partition adapted to extend outwardly from midway between the eyes of the observer, a pair of shutters vertically pivoted adjacent to said partition and adapted to be moved outwardly therefrom thereby to obscure the inner portions of the retinal fields of the eyes of the observer, a pair of shutters vertically pivoted adjacent to each side of the casing and movable therefrom toward the partition thereby to cover outer portions of the retinal fields of the eyes of the observer, shutters pivoted adjacent to the top and the bottom of said casing and on opposite sides of said partition and each movable about a horizontal axis, and a fourth pair of shutters pivoted respectively adjacent the top and the bottom of the casing and on opposite sides of the partition and movable about a horizontal axis.

5. An instrument of the character described comprising a support, devices adjustably mounted on said support for covering respectively the upper and the lower portions of the retinal fields of the eyes of the observer, devices adjustably mounted on said support for covering the inner portions of the retinal fields of the eyes of the observer, devices adjustably mounted on said support for covering the outer portions of the retinal fields of the eyes of the observer, a rectilinear object having indicia on opposite sides of its central portion, and a scale arranged at an angle to and extending across the central portion of said object and having thereon numerals indicating the degrees of displacement of balance.

6. An instrument for the purpose described comprising a support, means adjustable on said support for obscuring opposite portions of the retinal fields of the eyes of the observer, thereby to produce an intermediate band or zone of obscuration, a rectilinear object having a central portion corresponding to such band or zone of obscuration and series of indicia on opposite sides of such central portion, and a scale arranged at an angle to and extending across the central portion of said object and having thereon numerals indicating the degrees of displacement of balance.

7. An instrument of the character described comprising a support, and means adjustable on said support for obscuring the inner and the outer and the upper and the lower portions of the retinal fields of the eyes of the observer thereby to produce vertical and horizontal intermediate bands or zones of obscuration between such fields.

8. An instrument of the character described comprising a support and a pair of vertically pivoted shutters on said support adapted to be moved to cover opposite portions of the retinal fields of the eyes of the observer, thereby to produce an intermediate vertical band or zone of obscuration between such fields.

9. An instrument for the purpose described comprising a partition adapted to extend outwardly from midway between the eyes of the observer, and pivotal shutters movable toward and from said partition and adapted by such movement to cover opposite portions of the retinal fields of the eyes of the observer, thereby to provide an intermediate zone or band of obscuration.

10. An instrument of the character described comprising a support and a pair of horizontally pivoted shutters on said support adapted to be moved to cover the upper and the lower portions of the retinal fields of the eyes of the observer, thereby to produce an intermediate horizontal band or zone of obscuration between such fields.

11. In an instrument of the character described, the combination of a casing having a pair of apertures for application to the eyes of the observer, movably supported members within said casing and interposed between said apertures and an object to be viewed therethrough and adapted simultaneously to obscure opposite portions of the retinal fields of the eyes of such observer, thereby to produce an intermediate band or zone of obscuration, and slidable means connected to and connecting said members for operating the same in unison.

12. In an instrument of the character described, a determining and measuring device comprising a scale having numerals extending in opposite direction from the central portion thereof and a rectilinear object extending across the central portion of said scale and pivotally connected thereto, said rectilinear object having spaced similar images arranged on opposite sides of the central portion thereof.

13. In an instrument of the character described, the combination of a supporting casing having a pair of convergent partitions forming therebetween a narrow slit for application to the eyes of an observer, and means within said casing and adjustably supported therefrom for simultaneously obscuring opposite portions of the retinal fields of the eyes of such observer, thereby to produce an intermediate band or zone of obscuration.

In testimony whereof, I hereunto affix my signature.

CLARK SLOAN.